United States Patent
Moussanet et al.

(10) Patent No.: US 6,549,033 B2
(45) Date of Patent: Apr. 15, 2003

(54) SIGNAL PROCESSING DEVICE AND PROCESS AND ELECTRICAL APPARATUS COMPRISING SUCH A DEVICE

(75) Inventors: Roland Moussanet, N. Dame de Commiers (FR); Pierre Perichon, Voiron (FR)

(73) Assignee: Schneider Electric Industries SAS (FR)

( * ) Notice: Subject to any disclaimer, the term of this patent is extended or adjusted under 35 U.S.C. 154(b) by 0 days.

(21) Appl. No.: 10/011,728

(22) Filed: Dec. 11, 2001

(65) Prior Publication Data

US 2002/0118129 A1 Aug. 29, 2002

(30) Foreign Application Priority Data

Dec. 22, 2000 (FR) .............................. 00 16915

(51) Int. Cl.[7] .................................. G06F 7/38
(52) U.S. Cl. ........................ 326/37; 326/21; 326/22
(58) Field of Search ....................... 326/37, 21, 22, 326/136; 250/458.1, 459.1

(56) References Cited

U.S. PATENT DOCUMENTS

| | | |
|---|---|---|
| 5,043,585 A | 8/1991 | Fehrenbach et al. |
| 5,255,980 A | 10/1993 | Thomas et al. |
| 5,600,147 A * | 2/1997 | Jensen ..................... 250/458.1 |
| 5,986,272 A * | 11/1999 | Britton, Jr. et al. ...... 250/459.1 |
| 6,204,915 B1 | 3/2001 | Persegol et al. |

FOREIGN PATENT DOCUMENTS

| | | |
|---|---|---|
| EP | 0 940 655 A1 | 9/1999 |
| WO | WO 92/07240 | 4/1992 |

* cited by examiner

*Primary Examiner*—Michael Tokar
*Assistant Examiner*—Anh Q. Tran
(74) *Attorney, Agent, or Firm*—Parkhurst & Wendel, L.L.P.

(57) ABSTRACT

The signal processing device comprises determining means to supply an output signal having a value representative of a time constant of a part of an input signal having an appreciably exponential form. The determining means comprise first integrating means to supply a first integration signal representative of integration of the input signal in two opposite directions for appreciably equal times. Extraction means connected to the first integrating means supply a value representative of a time constant as a function of the first integration signal. The process comprises integration and extraction steps to supply the value representative of a time constant.

16 Claims, 5 Drawing Sheets

SIGNAL PROCESSING DEVICE AND PROCESS AND ELECTRICAL APPARATUS COMPRISING SUCH A DEVICE

BACKGROUND OF THE INVENTION

The invention relates to a device and a process for processing a signal comprising determining means to supply an output signal having a value representative of a time constant of a part of an input signal having an appreciably exponential form. The invention also relates to an electrical apparatus comprising at least one electrical conductor and at least one temperature sensor with fluorescent or luminescent material arranged near to said electrical conductor.

Known processing devices designed to give a value representative of a signal of exponential form generally use a sampling system to evaluate the signal at several points. The values of the measured samples then enable the amplitude and the time constant of the signal on the descent to be determined. However, when the signal contains noise or disturbances, such a measuring method does not enable precise values of the input signal to be obtained.

When the input signal is supplied by a sensor with fluorescent or luminescent material, the form of the signal is appreciably exponential on the descent and of small amplitude. Thus, as the signal is weak, disturbances are liable to be superposed on the signal. If amplifiers are used to amplify the signal, these disturbances persist and an offset signal can be added to the amplified signal. Such degradations make precise measurement of certain characteristics of the signal difficult, in particular extraction of a quantity representative of a time constant of exponential form.

OBJECT OF THE INVENTION

The object of the invention is to achieve a device and a process for processing a signal enabling precise measurement of a quantity representative of a time constant of appreciably exponential form of a signal and an apparatus comprising such a device.

In a device according to the invention, the determining means comprise:
first integrating means to supply a first integration signal representative of integration of the input signal in a first direction during a first preset time and of integration of the input signal in a second direction opposite to the first direction during a second preset time succeeding the first time and of appreciably equal value to said first time, and
extraction means connected to the first integrating means to supply, as a function of the first integration signal, the output signal having the value representative of a time constant of a part of a signal having an appreciably exponential form.

In a preferred embodiment, the determining means comprise second integrating means to supply a second integration signal representative of integration of the input signal in a first direction during a third preset time different from the first time and starting appreciably at the same time, and of integration of the input signal in a second direction opposite to the first direction during a fourth preset time succeeding the third time and of appreciably equal value to said third time, the extraction means being connected to the first integrating means and to the second integrating means to supply said output signal as a function of the first integration signal and the second integration signal.

Preferably, the first integration signal and/or the second integration signal are determined by at least one integration time of a reference signal between at least one of the values of the first and/or second of the integration signals after integration during a second time or a fourth time and a reference value triggering an end of integration.

Advantageously, the extraction means comprise means for determining the ratio between the first integration signal and the second integration signal, the value of the output signal being determined as a function of said ratio.

Preferably, the extraction means comprise a table of values to assign values of the output signal according to the ratio between the first integration signal and the second integration signal.

Preferably, the determining means comprise switching means to switch at least one input of the integrating means between an input signal and an inverted input signal, and a reference signal.

In a particular embodiment, the device comprises amplifying means to receive a measurement signal and to supply the input signal to the determining means.

In a particular embodiment, the device comprises means for receiving a light signal connected to the amplifying means, the light signal being supplied by a sensor with fluorescent or luminescent material.

For example, the light signal supplied by a sensor with fluorescent or luminescent material can be a signal representative of a temperature.

An electrical apparatus according to the invention, comprising at least one electrical conductor and at least one temperature sensor with fluorescent or luminescent material arranged near to said electrical conductor, comprises a processing device as defined above connected to said temperature sensor.

Preferably, a part of said at least one electrical conductor is in the form of an electric shunt and the fluorescent or luminescent material of the sensor is arranged on the part of the conductor in the form of an electric shunt.

In a particular embodiment, the electrical apparatus comprises:
at least one electrical contact in series with said at least one electrical conductor, and
means for processing tripping functions connected on output of the processing device to receive the output signal having a value representative of a time constant, and connected to a trip relay to command opening of said contacts.

In a preferred embodiment, said apparatus is an electrical circuit breaker.

In a signal processing process according to the invention comprising a determining phase to supply a value representative of a time constant of a part of an input signal having an appreciably exponential form,
the determining phase comprises:
a first step of integration of the input signal in a first direction during a first preset time,
a second step of integration of the input signal in a second direction opposite from the first direction during a second preset time appreciably equal to the first time and succeeding said first step, and
an extraction step to supply the value representative of a time constant as a function of the signal integrated by the first and second integration step.

Preferably, the determining phase comprises:
a third step of integration of the input signal in a first direction during a third preset time different from the first time and starting appreciably at the same time as said first step,
a fourth step of integration of the input signal in a second direction opposite from the first direction during a fourth preset time appreciably equal to the third time and succeeding said third step, the extraction step supplying the value representative of a time constant as a function of the signal integrated by the first and second integration step and of the signal integrated by the third and fourth integration step.

Advantageously, the extraction step supplies the value representative of a time constant as a function of the ratio between the signal integrated by the first and second integration step and the signal integrated by the third and fourth integration step.

BRIEF DESCRIPTION OF THE DRAWINGS

Other advantages and features of the invention will become more clearly apparent from the following description of particular embodiments of the invention given as non-restrictive examples only and represented in the accompanying drawings in which.

DETAILED DESCRIPTION OF THE PREFERRED EMBODIMENT

Figure 1:
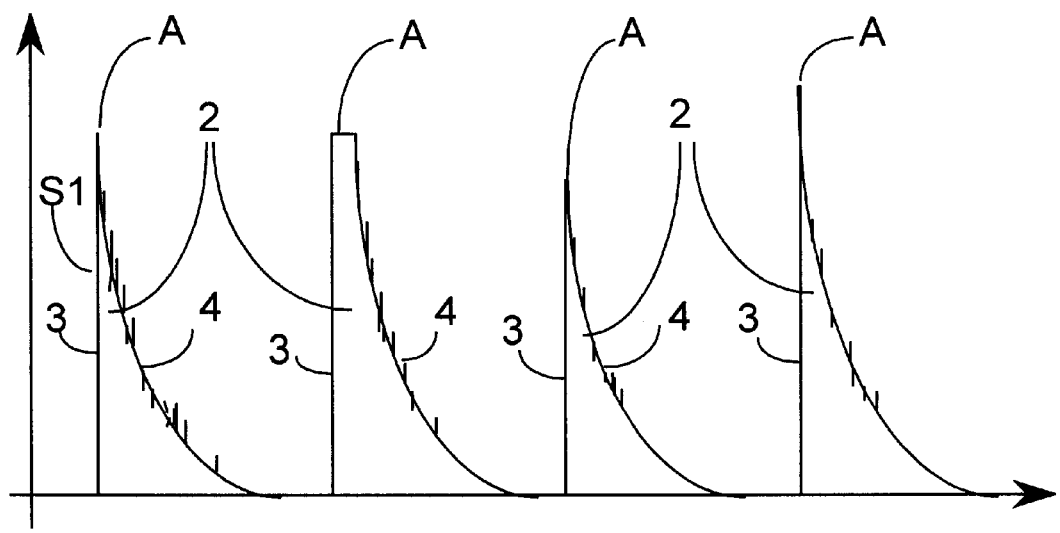
FIG. 1 illustrates an example of a signal to be processed by a device or process according to embodiments of the invention.

A signal S1 represented in FIG. 1 comprises pulses 2 each having a rising first part 3 going from a minimum value up to a maximum amplitude value A and a second part 4 decreasing appreciably exponentially. When measurements or information carried by the signal 1 are in a time constant of the descent part 4, a processing device enables a signal representative of said time constant to be supplied.

The descent part of the signal S1 can be expressed by the following function:

$$F1(t) = A \cdot e^{-\frac{t}{Ct}} + \mathit{Off} \tag{1}$$

In this expression, A represents the amplitude of the signal, t represents the time, Ct represents the time constant of the signal on the descent, and Off represents an offset value able to be introduced in particular by an amplifier.

To eliminate certain irregularities of the signal, the signal is preferably integrated during a preset time. The value of the time constant Ct can then be determined at the end of integration. However, such an integration is liable to integrate the offset value as well. Therefore, in an embodiment of the invention, the signal to be integrated is integrated in a first step in a first direction during a preset time and in a second opposite direction during appreciably the same time.

Figure 2:
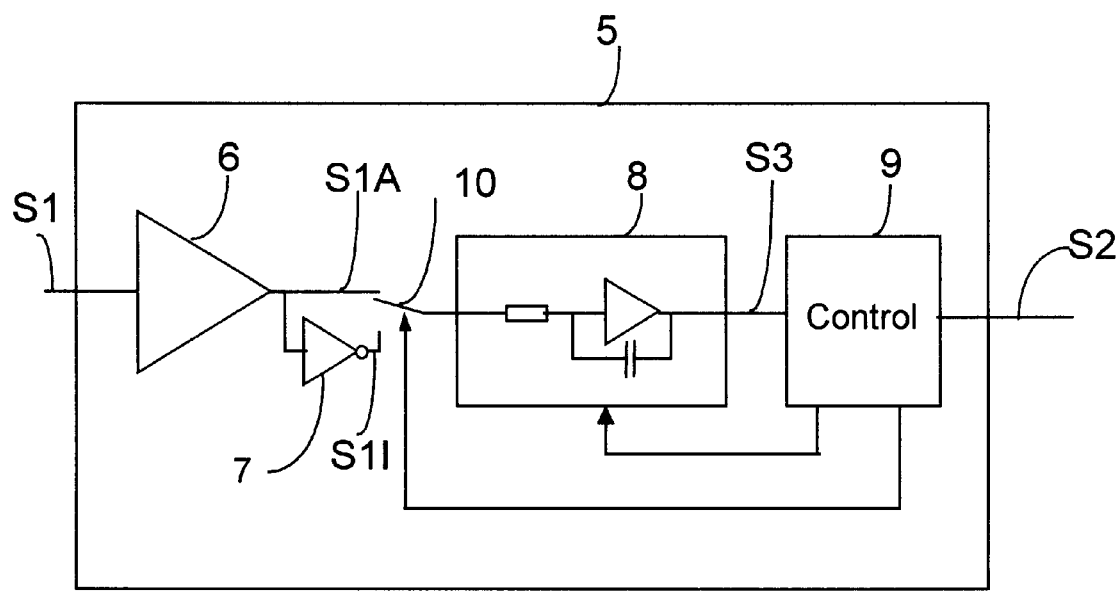
FIG. 2 represents a first diagram of a device according to an embodiment of the invention.

In the embodiment of FIG. 2, a processing device 5 receives the signal S1 to be measured and supplies a signal S2 representative of a time constant on the descent of the signal S1.

The signal S1 is amplified by an amplifier 6 that supplies an amplified signal S1A. The signal S1A is applied to an inverter 7 to supply an inverted signal S1I. A first integrator 8 successively receives the signals S1A and S1I then supplies an integration signal S3 to a control circuit 9 to extract the signal S2. The control circuit 9 commands a switch 10 to apply to the input of the first integrator the signal in a first direction S1A or the signal S1I that is in a second direction opposite to the first direction. The control circuit 9 also enables operation of the integrator to be commanded, in particular by initializing the integrator before each pulse of the signal S1.

When a signal S1 is applied to the input of the processing device 5, the amplifier amplifies the signal with the risk of superposing an offset signal Off on the amplified signal. Since in the equation F1(t) the signal Off is a constant, this signal is practically annulled by a first integration in a first direction and a second integration of the same duration in the opposite direction.

Integration of the signal of F1(t) can be expressed by the following function:

$$F2(t) = \frac{1}{RC} \cdot \left( \int_{t0}^{t0+T1} F1(t)\,dt - \int_{t0+T1}^{t0+2 \cdot T1} F1(t)\,dt \right) \tag{2}$$

A variable RC corresponds to an integration parameter, for example to a resistor and a capacitor associated to an operational amplifier in the case of an analog embodiment. A time t0 corresponds to the beginning of integration and T1 corresponds to the integration times in a first direction and in a second direction.

At the end of integration the integrated signal S3 can be expressed by the following function:

$$F3(t) = \frac{A \cdot Ct}{RC} \cdot \left( -2 \cdot e^{-\frac{t0+T1}{Ct}} + e^{-\frac{t0}{Ct}} + e^{-\frac{t0+2 \cdot T1}{Ct}} \right) \tag{3}$$

In certain applications requiring great precision it is advantageous to eliminate the influence of the value of the initial amplitude of the signal. Thus in an embodiment of the invention, two integrations of the signal over different time durations, starting appreciably at the same time, supply two integration signals respectively S3A and S3B. For the signal S3A the integration times in one direction and then in the other are represented by a value T1, and for the signal S3B the integration times in one direction and then in the other are represented by a value T2. In this case, the control device enables the value of the time constant Ct as a function of the ratio between the values of the integration signals S3A and S3B to be extracted.

At the end of integration, the integrated signal S3A can be expressed by the following function:

$$F3a(t) = \frac{A \cdot Ct}{RC} \cdot \left( -2 \cdot e^{-\frac{t0+T1}{Ct}} + e^{-\frac{t0}{Ct}} + e^{-\frac{t0+2 \cdot T1}{Ct}} \right) \tag{4}$$

At the end of integration, the integrated signal S3B can be expressed by the following function:

$$F3b(t) = \frac{A \cdot Ct}{RC} \cdot \left( -2 \cdot e^{-\frac{t0+T2}{Ct}} + e^{-\frac{t0}{Ct}} + e^{-\frac{t0+2 \cdot T2}{Ct}} \right) \tag{5}$$

In this case, T2 corresponds to the integration times in a first direction and in a second direction, T2 being different from T1.

The corresponding ratio of S3A over S3B, F3a(t)/F3b(t), can be expressed by the following function F4 (Ct):

$$F4(Ct) = \frac{-2 \cdot e^{-\frac{t0+T1}{Ct}} + e^{-\frac{t0}{Ct}} + e^{-\frac{t0+2 \cdot T1}{Ct}}}{-2 \cdot e^{-\frac{t0+T2}{Ct}} + e^{-\frac{t0}{Ct}} + e^{-\frac{t0+2 \cdot T2}{Ct}}} \quad (6)$$

Figure 3A:
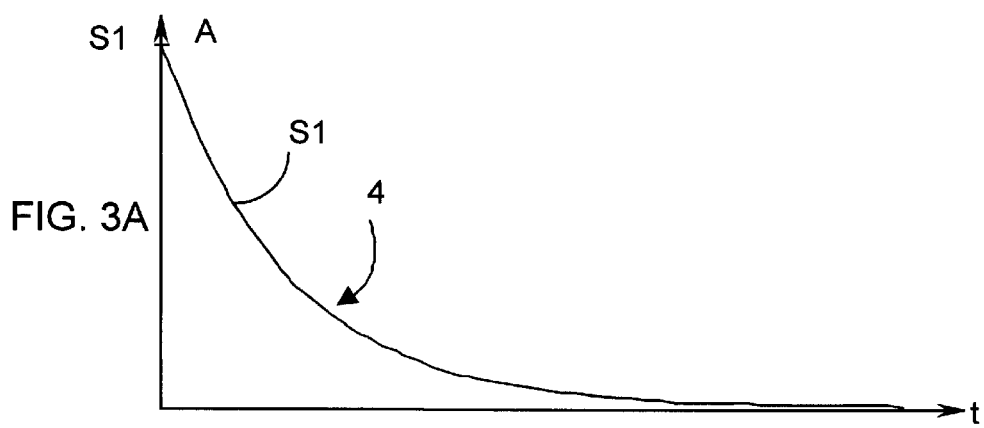
FIGS. 3A, 3B and 3C represent signals in a device according to an embodiment of the invention.
Figure 3B:
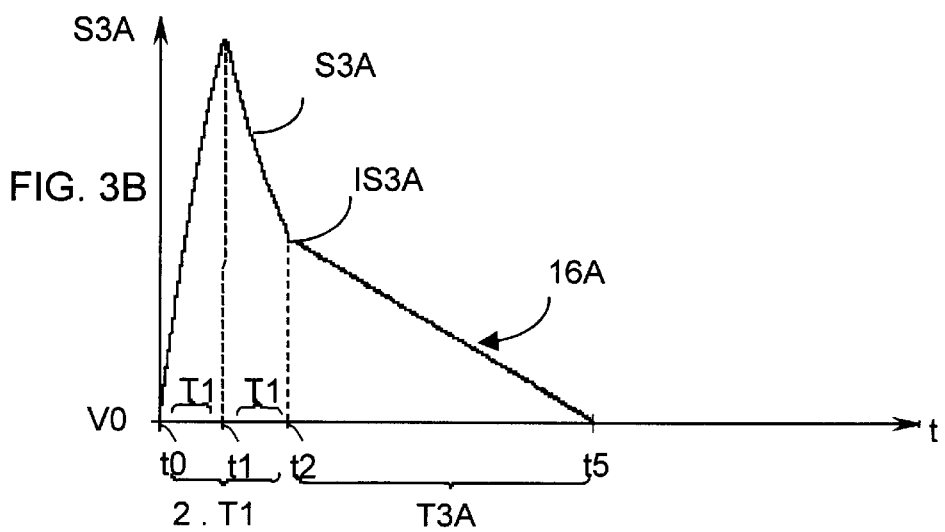
Figure 3C:
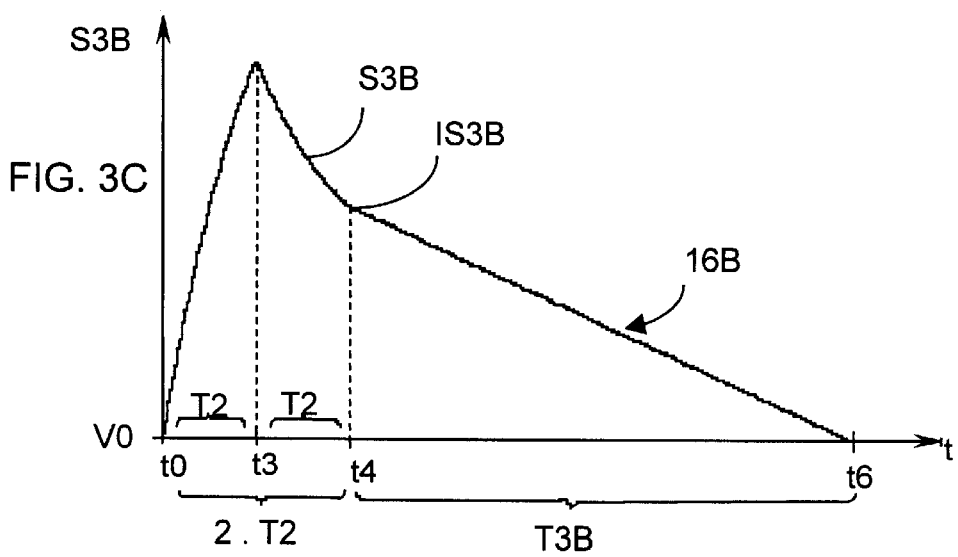

FIGS. 3A, 3B and 3C respectively illustrate the descending part of the signal S1 or S1A and the integration signals S3A and S3B. In FIG. 3B the signal S3A represents integration of the signal S1 or S1A in a first direction for a time T1 between a beginning of integration time t0 and a time t1. Then between the time t1 and a time t2, a second integration of the inverted signal S1 or S1I takes place during a second time T1. These two successive integrations can be represented by a function F2(t) and a value IS3A of the signal S3A at the end of integration at the time t2 can be represented by a function F3(t) or F3a(t). In FIG. 3C the signal S3B represents integration of the signal S1 or S1A in a first direction during a time T2 different from T1 between a beginning of integration time t0 and a time t3. Then, between the t3 and a time t4, a second integration of the inverted signal S1 or S1I takes place during a second time T2. These two successive integrations can be represented by a function F2(t) in which T1 is replaced by T2 and a value IS3B of the signal S3B at the end of integration at the time t4 can be represented by a function F3b(t).

Comparison of the signals IS3A and IS3B at the end of integration enables the influence of the amplitude A of the signal S1 to be eliminated. Thus, even if the amplitude of the pulses changes or comprises a drift in time according to variations of characteristics of electronic components or voltage or current sources, measurement of the time constant Ct remains stable in time. Relations between the time constant Ct and the ratio of the signals IS3A and IS3B can be made according to the function F4(Ct). This relation can be made by calculation or by table of correspondence in a memory.

Figure 4:
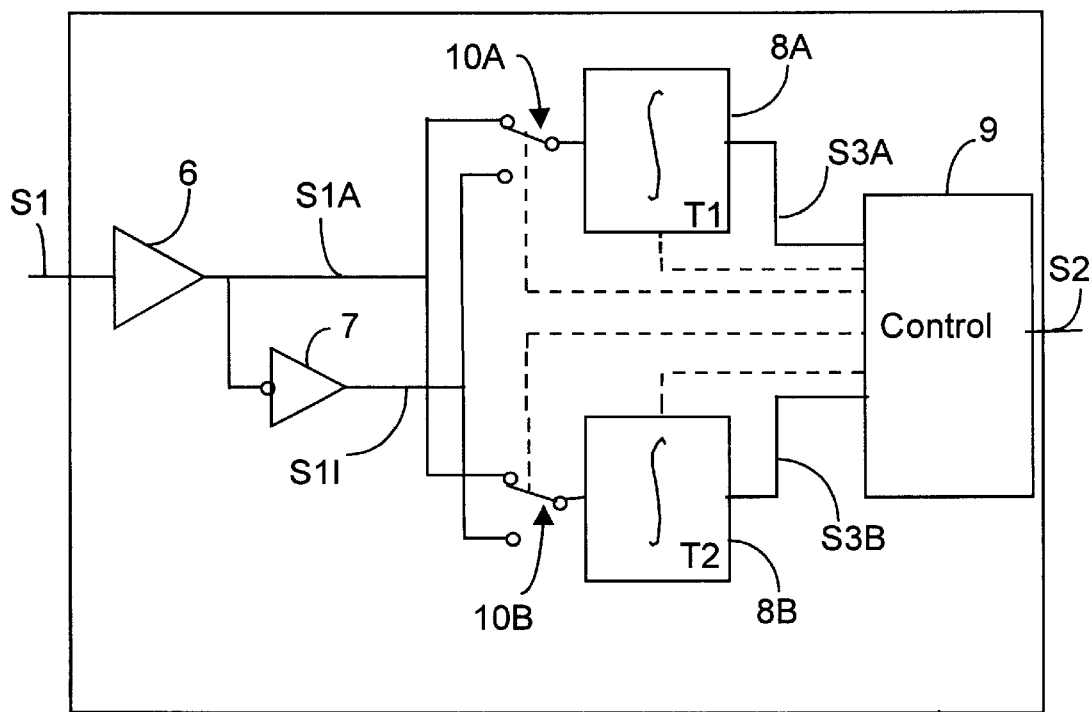
FIG. 4 represents a second diagram of a device according to an embodiment of the invention.

An embodiment of a processing device 5 with two integration circuits is represented in FIG. 4. A first integration circuit 8A associated to a switch 10A supplies the first signal S3A integrated with first times T1, and a second integration circuit 8B associated to a switch 10B supplies the second signal S3B integrated with second times T2. The control circuit 9 monitors the different integrations of the signal, receives the signals S3A and S3B, and supplies a signal S2 representative of the time constant Ct of the input signal.

If the integrations are made with analog components with RC circuits introducing integration constants, it is possible to annul the effects of the precisions of these components by performing an integration of a reference signal Vref. The starting point of this integration corresponds to the values IS3A and IS3B of the signal(s) S3A and S3B at the end of integration at the times respectively t2 or t4. The end of integration corresponds to the time when the integration signal reaches a threshold value, preferably a nil value. In FIGS. 3B and 3C, the integration times, represented respectively by T3A between the time t2 and a time t5, and by T3B between the time t4 and a time t6, are then directly representative of the values of said signals IS3A and IS3B. The integration constants RC introduced in all the integrations are annulled at the end of integration.

To improve the precision, the reference signal Vref can advantageously be proportional to the amplitude A of the signal S1.

Integration of a reference signal Vref can be expressed by the following function F5(t):

$$F5(t) = F3(t) + \frac{1}{R \cdot C} \cdot \int_0^{T3} Vref(t)dt \quad (7)$$

In this expression the time T3 is variable, it depends on an integration overshoot threshold, for example a threshold of zero value. Vref can be of positive or negative value according to the initial direction of S1.

If the threshold is equal to zero, the function F5(t) is also equal to zero at times t5 and t6. This means that the two parts of F5(t) are of inverted values. We can then base ourselves on the following expressions for the signal S2A:

$$\frac{1}{R \cdot C} \cdot Vref \cdot T3 = \frac{A \cdot Ct}{R \cdot C} \cdot \left(-2 \cdot e^{-\frac{t0+T1}{Ct}} + e^{-\frac{t0}{Ct}} + e^{-\frac{t0+2 \cdot T1}{Ct}}\right), \quad (8)$$

$$T3A = \frac{A \cdot Ct}{Vref} \cdot \left(-2 \cdot e^{-\frac{t0+T1}{Ct}} + e^{-\frac{t0}{Ct}} + e^{-\frac{t0+2 \cdot T1}{Ct}}\right) \quad (9)$$

and $$T3B = \frac{A \cdot Ct}{Vref} \cdot \left(-2 \cdot e^{-\frac{t0+T2}{Ct}} + e^{-\frac{t0}{Ct}} + e^{-\frac{t0+2 \cdot T2}{Ct}}\right). \quad (10)$$

The ratio of the signals S2A and S2B can be defined by the following expression:

$$\frac{T3A = \frac{A \cdot Ct}{Vref} \cdot \left(-2 \cdot e^{-\frac{t0+T1}{Ct}} + e^{-\frac{t0}{Ct}} + e^{-\frac{t0+2 \cdot T1}{Ct}}\right)}{T3B = \frac{A \cdot Ct}{Vref} \cdot \left(-2 \cdot e^{-\frac{t0+T2}{Ct}} + e^{-\frac{t0}{Ct}} + e^{-\frac{t0+2 \cdot T2}{Ct}}\right)} \quad (11)$$

The ratio of S3A over S3B corresponding to T3A/T3B can be expressed by the following function F4(Ct):

$$F4(Ct) = \frac{-2 \cdot e^{-\frac{t0+T1}{Ct}} + e^{-\frac{t0}{Ct}} + e^{-\frac{t0+2 \cdot T1}{Ct}}}{-2 \cdot e^{-\frac{t0+T2}{Ct}} + e^{-\frac{t0}{Ct}} + e^{-\frac{t0+2 \cdot T2}{Ct}}} \quad (12)$$

similar to the function F4(Ct) defined above in (6).

Figure 5:
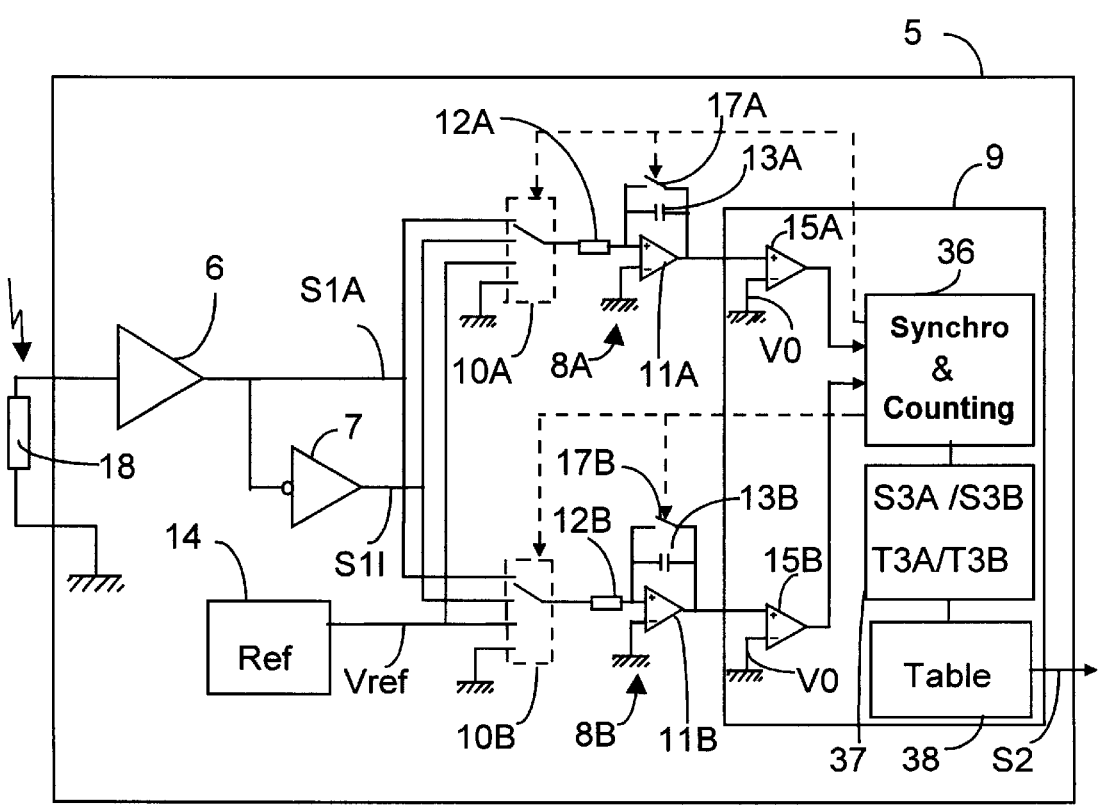
FIG. 5 represents a third diagram of a device according to an embodiment of the invention.

FIG. 5 shows an embodiment wherein integrators 8A and 8B are achieved in analog manner. Each integrator comprises an amplifier 11A and 11B respectively associated to an input resistor 12A and 12B and a capacitor 13A and 13B. The input resistors of the integrators are connected to switches respectively 10A and 10B to receive the signals S1A, S1I and a reference signal Vref supplied by a reference voltage source 14. The switches are commanded during different time durations.

For example, the switch 10A is commanded by a synchronization and counting circuit 36 of the control circuit 9 to apply the signal S1A during a time T1, then the signal S1I during a time T1, and finally the signal Vref to the input resistor 12A of the integrator 8A to make the integrator integrate up to a nil value V0 of the integration output. While the switch is commanded to apply the reference value Vref, the control circuit 9 comprises means 36 for counting the integration time up to a nil value V0 of the output of the integrator 8A. A comparator 15A, connected to the integrator 8A, detects the zero crossing V0 of the integration output and informs the circuit 36 of the control circuit 9 to stop counting of the integration time T3A.

In the same way, the switch 10B is commanded by the circuit 36 to apply the signal S1A during a time T2, then the signal S1I during a time T2 and finally the signal Vref to the input resistor 12B of the integrator 8B to make the integrator integrate up to a nil value V0 of the integration output. While the switch is commanded to apply the reference value Vref, the control circuit 9 comprises means 36 for counting the integration time up to a nil value V0 of the output of the integrator 8B. A comparator 15B, connected to the integrator 8B, detects the zero crossing V0 of the integration output and informs the circuit 36 of the control circuit 9 to stop counting of the integration time T3B. The integrations of the reference value Vref are represented in parts 16A and 16B of the curves of FIGS. 3B and 3C. These final integrations eliminate the influence of the precision of the integrator components, in particular the resistors 12A and 12B and capacitors 13A and 13B. The use, in each integrator, of appreciably equal integration periods while inverting the input signal enables the effects of an offset signal Off to be cancelled out.

Before each integration, the integrators are initialized by the control circuit which sets the inputs to a zero value corresponding to the ground of the circuit and discharges the capacitors 13A and 13B by commanding discharge devices 17A and 17B. The signal S2 representative of the time constant on the descent of the input signal S1 can be determined in the control circuit as a function of the times T3A and T3B or of the ratio T3A/T3B between said times representative of the ratio S3A/S3B determined in a circuit 37. The value Ct of S2 can advantageously be supplied by means of a table 38 of correspondence receiving the values of the rations T3A/T3B or S3A/S3B. This table is preferably stored notably in an electronic memory. The use of two integration channels having different integration times T1 and T2 eliminates the influence of the value of the amplitude of the input signal.

In an embodiment in integrated or hybrid circuits, the integration circuits 8A and 8B can comprise capacitors and resistors that are precisely adjusted, in particular by screen-printing, by laser or sand jet cutting. These circuits enable the control circuit 9 to be advantageously simplified and integration with a reference value Vref represented by the parts of curves 16A and 16B to be avoided.

In FIG. 5, means for receiving a light signal 18 are connected to the amplifier 6. These means for receiving a light signal can receive light signals supplied by a sensor with fluorescent or luminescent material having an appreciably exponential decrease after excitation by light rays. The exponential decrease of the light signal supplied by the sensor with fluorescent or luminescent material can be representative of a temperature to be measured.

Figure 6:
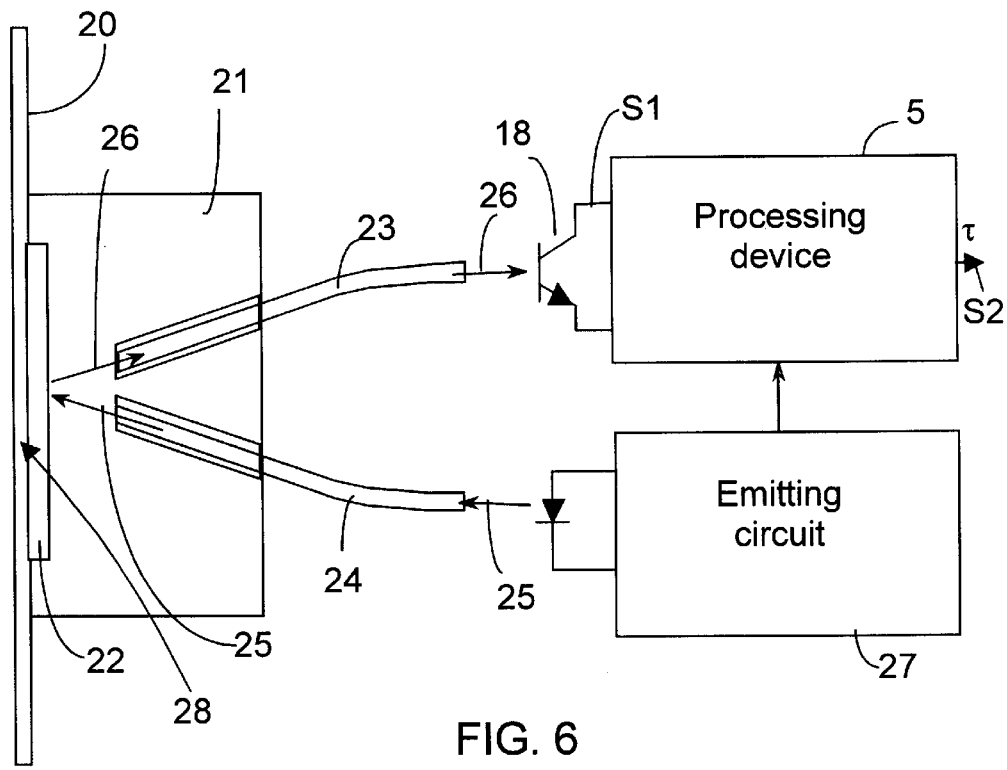
FIG. 6 represents a first diagram of an electrical apparatus according to an embodiment of the invention.

An electrical apparatus, according to an embodiment of FIG. 6, comprises an electrical conductor 20 on which conductor a sensor 21 with fluorescent or luminescent material 22 is arranged. The sensor 21 comprises, for example, two optic carriers such as optic fibers 23 and 24 to direct a first excitation light beam 25 to the material 22 and to retrieve a second light beam 26 coming from the material 22 and directed to the means for receiving 18. The first beam can be emitted by an emitting circuit 27 synchronized for example with the processing device 5. The signal of the second beam comes from the material 22 which reacts to the excitation of the first beam. In this embodiment, the reaction of the material 22 is dependent on the temperature which modifies the time constant on the descent of the signal. As the material 22 acts according to the temperature, the arrangement of such a material 22 on an electrical conductor 20 enables the temperature or heat rise thereof when an electric current is flowing therethrough to be measured. To improve measurement of the effects of the electric current on the material 22, the fluorescent or luminescent material of the sensor is preferably arranged on a part 28 of the conductor having the form of an electric shunt.

Figure 7:
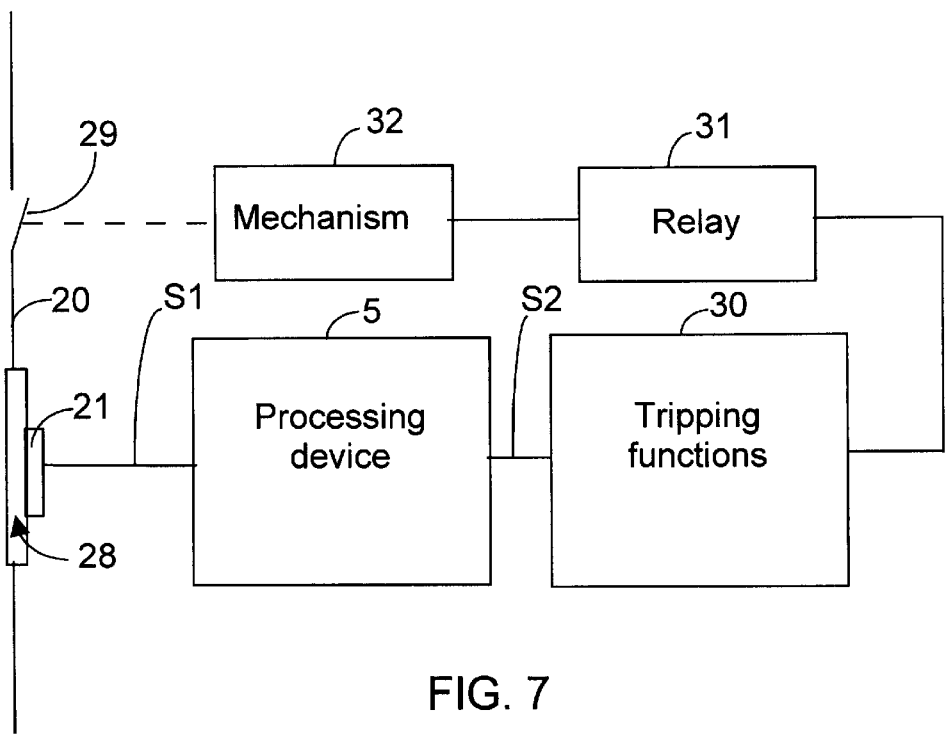
FIG. 7 represents a second diagram of an electrical apparatus according to an embodiment of the invention.

FIG. 7 represents an electrical apparatus comprising at least one electrical contact 29 connected in series with at least one electrical conductor 20. A sensor 21 is arranged on a part 28 of the conductor having the form of a shunt to supply a signal S1 the part of decreasing exponential form of which signal is representative of the temperature detected by the sensor. For example, the sensor can detect the temperature of the conductor in the part in the form of an electric shunt liable to heat by flow of an electric current. A processing device 5 is connected to the sensor 21 to receive the signal S1 and to supply an output signal S2 representative of the time constant of the pulses of the signal S1 and consequently representative of the temperature of the conductor 20 and of the current flowing therethrough. A tripping function processing circuit 30 is connected on output of the processing device 5 to receive the signal S2. The circuit 30 processes the tripping functions and supplies a tripping order to a trip relay 31 to cause opening of the contact 29 by a mechanism 32. For example, if the signal S2 exceeds a preset threshold, instantaneously or for a preset time, the processing circuit 30 gives a tripping order to open said at least one contact 29.

Figure 8:
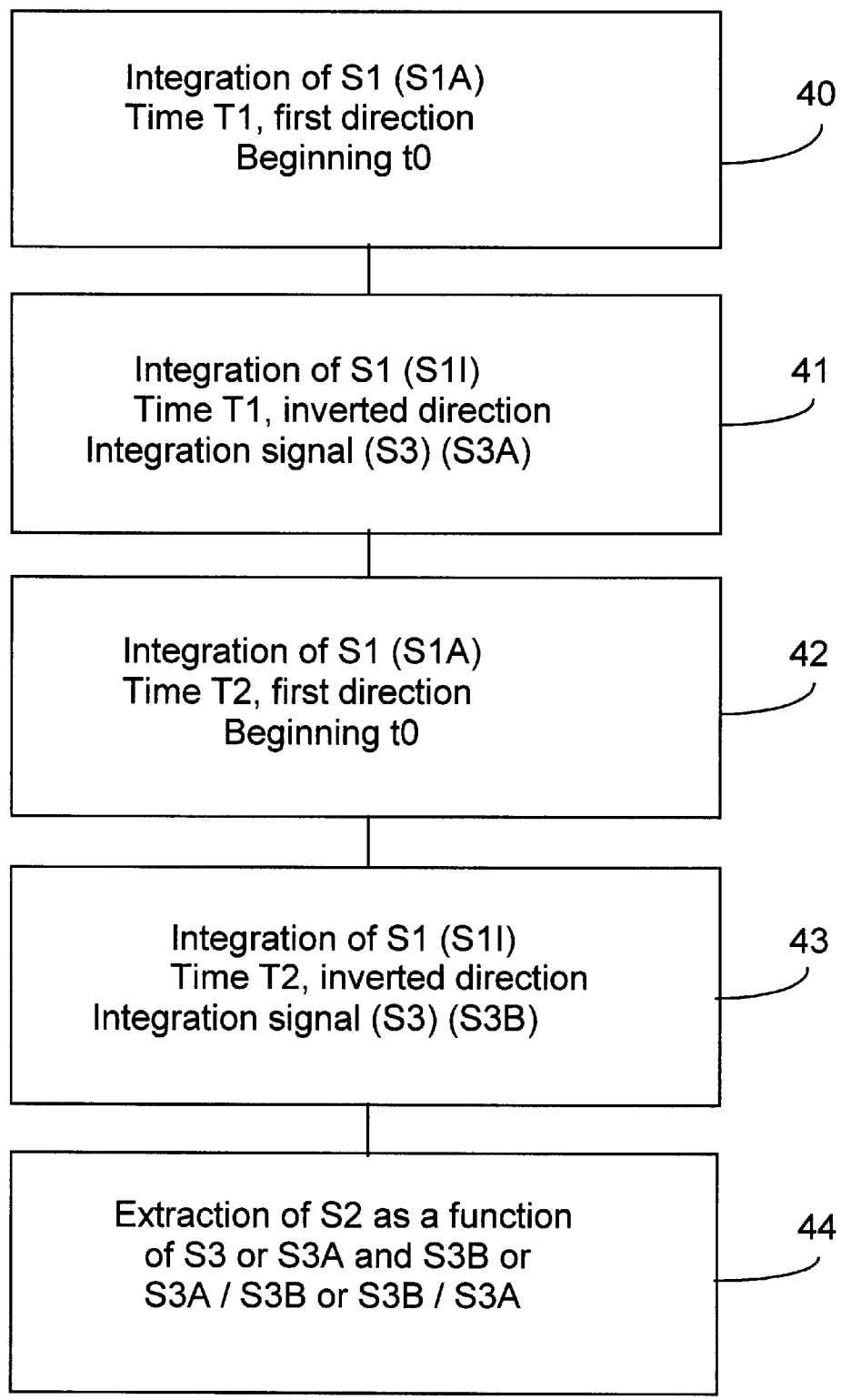
FIG. 8 represents a processing process according to an embodiment of the invention.

A flowchart of a processing process is represented in FIG. 8. This signal processing process comprises a determining phase to supply a value representative of a time constant of a part of an input signal S1 or S1A having an appreciably exponential form. Said determining phase comprises a first step of integration 40 of the input signal S1 or S1A in a first direction during a first preset time T1 beginning at a time t0, and a second step 41 of integration of the input signal S1 or S1I in a second direction opposite from the first direction during a second preset time T1 appreciably equal to the first time and succeeding said first time. If the process has a single integration channel an extraction step 44 supplies a value S2 or Ct representative of the time constant as a function of a signal S3A integrated by the integration steps 40 and 41.

Preferably, the process comprises two integration channels to eliminate the influence of the amplitude of the signal S1. In this embodiment, the determining phase comprises a third integration step 42 of the input signal S1 or S1A in a first direction during a third preset time T2 different from the first time T1 and beginning appreciably at the same time t0 as said first step 40, and a fourth integration step 43 of the input signal S1 or in a second direction opposite from the first direction during a fourth preset time T2 appreciably equal to the third time and succeeding said third step. In this process, the extraction step supplies the value S2 or Ct representative of a time constant as a function of a signal S3A integrated by the first and second integration steps 40 and 41, and of a signal S3B integrated by the third and fourth integration steps 42 and 43.

Advantageously, the extraction step 44 supplies the value S2 or Ct representative of a time constant as a function of the ratio S3A/S3B or S3B/S3A between the signal S3A integrated by the first and second integration step and the signal S3B integrated by the third and fourth integration step.

The device and process described above can be implemented in embodiments comprising in particular analog, digital and/or programmed components in a microcontroller or for a microprocessor.

What is claimed is:
1. A device for processing a signal comprising means for determining to supply an output signal having a value representative of a time constant of a part of an input signal having an appreciably exponential form, a device wherein the means for determining comprise:

first integrating means to supply a first integration signal representative of integration of the input signal in a first direction during a first preset time and of integration of the input signal in a second direction opposite to the first direction during a second preset time succeeding the first time and of appreciably equal value to said first time, and extraction means connected to the first integrating means to supply, as a function of the first integration signal, the output signal having the value representative of a time constant of a part of a signal having an appreciably exponential form.

2. The processing device according to claim 1 wherein the determining means comprise second integrating means to supply a second integration signal representative of integration of the input signal in a first direction during a third preset time different from the first time and starting appreciably at the same time, and of integration of the input signal in a second direction opposite to the first direction during a fourth preset time succeeding the third time and of appreciably equal value to said third time, the extraction means being connected to the first integrating means and to the second integrating means to supply said output signal as a function of the first integration signal and the second integration signal.

3. The processing device according to claim 2 wherein the first integration signal and/or the second integration signal are determined by at least one integration time of a reference signal between at least one of the values of the first and/or second of the integration signals after integration during a second time or a fourth time and a reference value triggering an end of integration.

4. The processing device according to claim 2 wherein the extraction means comprise means for determining the ratio between the first integration signal and the second integration signal, the value of the output signal being determined as a function of said ratio.

5. The processing device according to claim 4 wherein the extraction means comprise a table of values to assign values of the output signal according to the ratio between the first integration signal and the second integration signal.

6. The processing device according to claim 1 wherein the determining means comprise switching means to switch at least one input of the integrating means between an input signal and an inverted input signal, and a reference signal.

7. The processing device according to claim 1 comprising amplifying means to receive a measurement signal and to supply the input signal to the determining means.

8. The processing device according to claim 7 comprising means for receiving a light signal connected to the amplifying means, the light signal being supplied by a sensor with fluorescent or luminescent material.

9. The processing device according to claim 8 wherein the light signal supplied by a sensor with fluorescent or luminescent material is a signal representative of a temperature.

10. An electrical apparatus comprising at least one electrical conductor and at least one temperature sensor with fluorescent or luminescent material arranged near to said electrical conductor comprising a processing device according to claim 1 connected to said temperature sensor.

11. The electrical apparatus according to claim 10 wherein a part of said at least one electrical conductor is in the form of an electric shunt and the fluorescent or luminescent material of the sensor is arranged on the part of the conductor in the form of an electric shunt.

12. The electrical apparatus according to claim 10 comprising:

at least one electrical contact in series with said at least one electrical conductor, and means for processing tripping functions connected on output of the processing device to receive an output signal having a value representative of a time constant, and connected to a trip relay to command opening of said contacts.

13. The electrical apparatus according to claim 12 wherein said apparatus is an electrical circuit breaker.

14. A processing process of a signal comprising a determining phase to supply a value representative of a time constant of a part of an input signal having an appreciably exponential form, wherein the determining phase comprises:

a first step of integration of the input signal in a first direction during a first preset time, a second step of integration of the input signal in a second direction opposite from the first direction during a second preset time appreciably equal to the first time and succeeding said first step, and an extraction step to supply the value representative of a time constant as a function of a signal integrated by the first and second integration step.

15. The processing process according to claim 14 wherein the determining phase comprises:

a third step of integration of the input signal in a first direction during a third preset time different from the first time and starting appreciably at the same time as said first step, a fourth step of integration of the input signal in a second direction opposite from the first direction during a fourth preset time appreciably equal to the third time and succeeding said third step, the extraction step supplying the value representative of a time constant as a function of the signal integrated by the first and second integration step and of the signal integrated by the third and fourth integration step.

16. The processing process according to claim 15 wherein the extraction step supplies the value representative of a time constant as a function of a ratio between the signal integrated by the first and second integration step and the signal integrated by the third and fourth integration step.

* * * * *